(12) United States Patent
Bai et al.

(10) Patent No.: US 11,045,953 B2
(45) Date of Patent: Jun. 29, 2021

(54) RELOCALIZATION METHOD AND ROBOT USING THE SAME

(71) Applicant: UBTECH ROBOTICS CORP LTD, Shenzhen (CN)

(72) Inventors: Longbiao Bai, Shenzhen (CN); Youjun Xiong, Shenzhen (CN); Zhichao Liu, Shenzhen (CN); Jian Zhang, Shenzhen (CN); Yongsheng Zhao, Shenzhen (CN); Jianxin Pang, Shenzhen (CN)

(73) Assignee: UBTECH ROBOTICS CORP LTD., Shenzhen (CN)

( * ) Notice: Subject to any disclaimer, the term of this patent is extended or adjusted under 35 U.S.C. 154(b) by 292 days.

(21) Appl. No.: 16/427,349

(22) Filed: May 31, 2019

(65) Prior Publication Data
US 2020/0206927 A1 Jul. 2, 2020

(30) Foreign Application Priority Data
Dec. 29, 2018 (CN) .......................... 201811635479.0

(51) Int. Cl.
*B25J 9/16* (2006.01)
(52) U.S. Cl.
CPC ........... *B25J 9/1666* (2013.01); *B25J 9/1697* (2013.01)

(58) Field of Classification Search
CPC .............................. B25J 9/1666; B25J 9/1697
See application file for complete search history.

(56) References Cited

U.S. PATENT DOCUMENTS 9,102,055 B1 * 8/2015 Konolige ............. G06K 9/3208
2019/0329407 A1 * 10/2019 Qi ............................. G06T 7/73

\* cited by examiner

*Primary Examiner* — Khoi H Tran
*Assistant Examiner* — Nhi Q Bui (57) ABSTRACT

The present disclosure provides a relocalization method including: obtaining submap boundary points; drawing a first submap based on the submap boundary points; extracting a second submap from the first submap; performing a template matching on a known map based on the second submap to obtain first matching results; obtaining second matching result each corresponding to each of the first matching results based on a positional relationship of the second submap in the first submap: matching boundary points in each of the second matching results with the submap boundary points to filter out third matching results from the second matching results; and selecting one of the third matching results as a relocalization result. The present disclosure further provides a robot. In the above-mentioned manner, it is capable of realizing a re localization with high accuracy, high preciseness, and low error rate while there are environmental changes.

19 Claims, 5 Drawing Sheets

RELOCALIZATION METHOD AND ROBOT USING THE SAME

CROSS REFERENCE TO RELATED APPLICATION PROGRAMS

This application claims priority to Chinese Patent Application No. CN201811635479.0, filed Dec. 29, 2018, which is hereby incorporated by reference herein as if set forth in its entirety.

BACKGROUND

1. Technical Field

The present disclosure relates to localization technology, and particularly to a relocalization method and a robot using the same.

2. Description of Related Art

For the autonomous moving machines such as robots or unmanned aerial vehicles, the data of the sensors installed thereon can be collected during its operation process, and the position and posture i.e., the pose) of the machine itself can be positioned by using the existing map data, thereby performing autonomous navigation.

In a navigation process, it often needs to detect the surrounding environment and determine the current position of the machine in the map based on a known map while, for example, during the initialization process or there has a localization error during the navigation process, which is referred to as relocalization.

The commonly used relocalization method is the adaptive Monte Carlo localization (AMCL) method, which has few computing resource requirements, and has high accuracy and less time consumption in the environments which are unchanging and has obvious features. However, in the changing environments, which will have low accuracy, high error rate, and much time consumption In practical applications, the change of the environments are difficult to control, and the relocalization using the AMCL method may cause errors and affect the safety of navigation.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

The present disclosure is described in detail in conjunction with the drawings and embodiments as follows. The following embodiments which do not conflict with each other may be combined.

Figure 1:
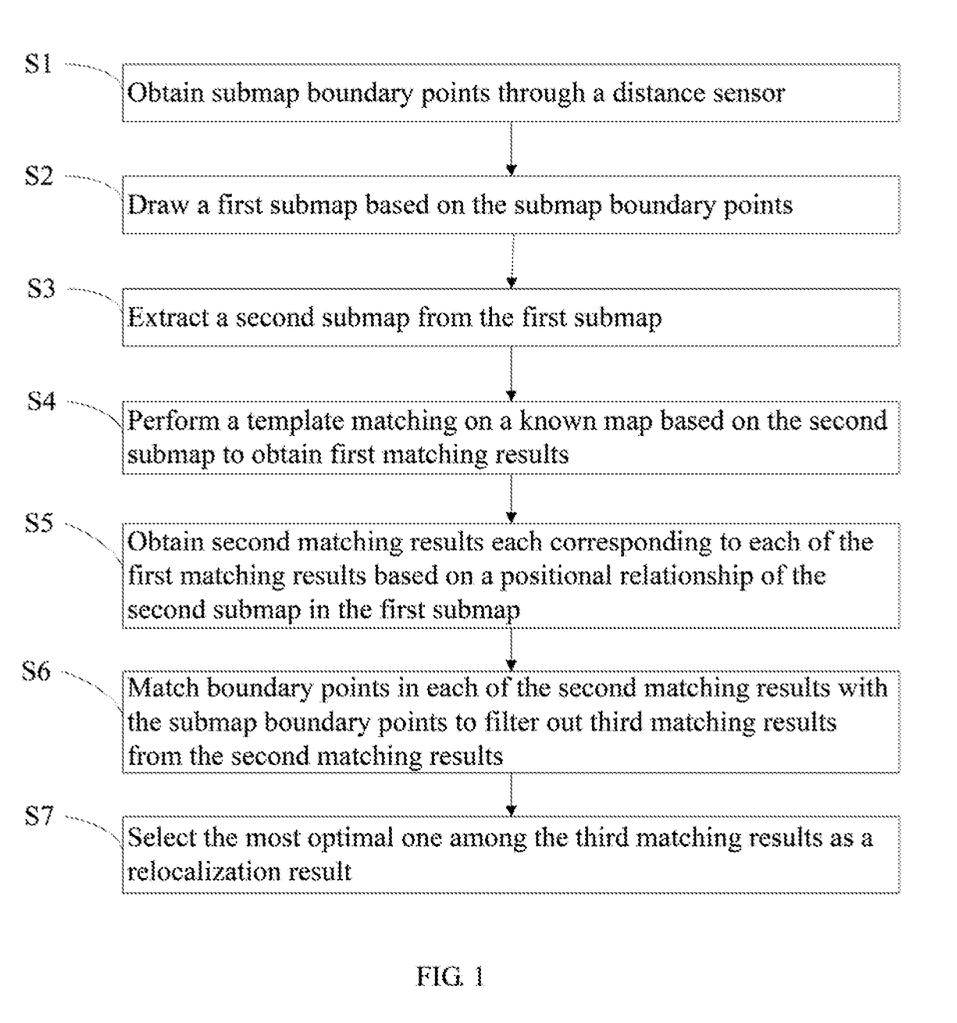
FIG. 1 is a flow chart of an embodiment of a relocalization method according to the present disclosure.
Figure 5:
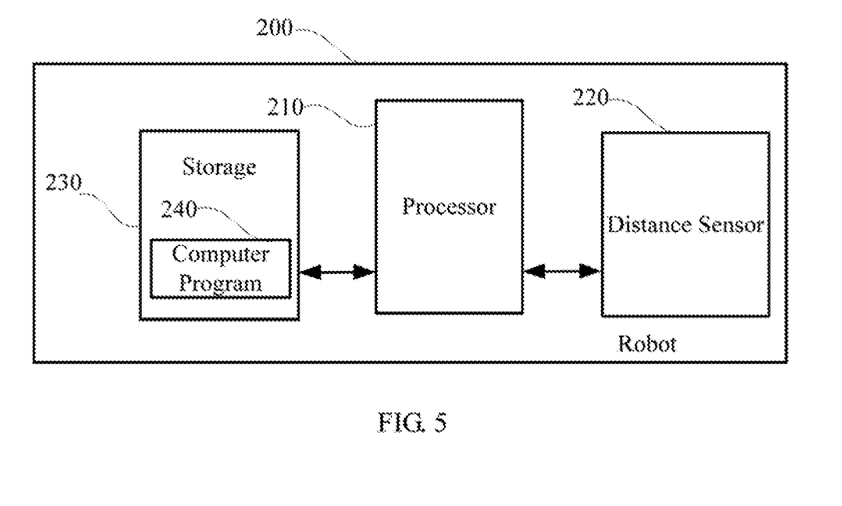
FIG. 5 is a schematic block diagram of an embodiment of a robot according to the present disclosure.

FIG. 1 is a flow chart of an embodiment of a relocalization method according to the present disclosure. In this embodiment, a relocalization method is provided. The method is a computer-implemented method executable for a processor, which may be implemented through and applied to a relocalization apparatus for a robot having a distance sensor or a robot as shown in FIG. 5 that has a distance sensor, or through a computer readable storage medium. As shown in FIG. 1, the method includes the following steps.

S1: obtaining, through the distance sensor, a plurality of submap boundary points.

In this embodiment, the relocalization method is applied to a robot. In other embodiments, the relocalization method can be applied to other device capable of autonomous movement and navigation, for example, an unmanned aerial vehicle.

The commonly used sensors for locating robots are distance sensors such as lidars (laser radars). The robot can range surrounding objects by using the distance sensor to scan the surrounding environment to obtain the plurality of submap boundary points. Each submap boundary point has angle information and distance information that provides information about a map boundary (e.g., an obstacle) at an angle corresponding to the angle information. The distance sensor can also be an ultrasonic ranging sensor, an infrared ranging sensor, or the like.

S2: drawing a first submap based on the submap boundary points.

The robot may be taken as the center, so as to draw the first submap based on the angle information and the distance information of each submap boundary point, such that the submap boundary points form the first submap. In the first submap, an area between the robot and the submap boundary points is the area where the robot can be moved freely, that is, a free space. Since the area beyond the submap boundary points is unknown or behind obstacles), the robot can not be moved freely, which can be referred to as a non-free space. The free space and the non-free space are separated by the submap boundary points. In the first submap, different pixel values can be used to distinguish the free space, the non-free space, and the submap boundary points.

S3: extracting a second submap from the first submap.

In which, a ratio of a feature value of a free space of the second submap to a feature value of the free space of the first submap is larger than or equal to a preset threshold, where the preset threshold is larger than 0 and less than 1.

The feature value of the free space may be a sum of the free space, for example, the feature value of the free space of the first submap may be the total amount of the pixels belonging to the free space in the first submap. Alternatively, the feature value of the free space may be a weighted sum of the free space, for example, the feature value of the free space of the first submap may be the sum of the confidence weight of the pixels belonging to the free space in the first submap. The weight of the free space can be the confidence weight calculated based on a data error model. The data error model can be a distance data error model obtained by ranging through the distance sensor. For example, if a lidar is used as the distance sensor, the data error model can be a laser data error model.

In this embodiment, the second submap is centered on the position of the robot in the first submap, and the feature value of the free space is equal to the smallest rectangle of the product of the feature value of the free space of the first submap and the preset threshold. In other embodiments, the second submap may also be trapezoidal, parallelogram, triangular, or the like.

S4: performing a template matching on a known map based on the second submap to obtain a plurality of first matching results.

The second submap may represent the main features of the free space in the first submap, and performing the template matching by using the second submap instead of the first submap can be more adaptive to the change of the environment, that is, in the case that the environment is changed (e.g., an obstacle appears unexpectedly), the success rate of performing the template matching by using the second submap is higher than the success rate of performing the template matching by using the first submap.

The template matching is a commonly used matching method. By placing a template on an image to be searched, indicators for evaluating the similarity between the template and the area covered by the template on the image to be searched (also referred to as a submap) are calculated. After the calculation is completed, the template is shifted and the above-mentioned process is repeated, and finally one or more submaps that are most similar to the template are founded out from all the submaps based on all the calculated indicators to take as a result of the template matching.

Since the template matching only involves the shifting operation while rotations cannot be performed, and first submap may need to be rotated because the direction of the first submap may be not consistent with the direction of the known map. To avoid the missing of the matching results, the second submap and/or the known map can be rotated (for a plurality of angles) before performing the template matching.

Figure 2:
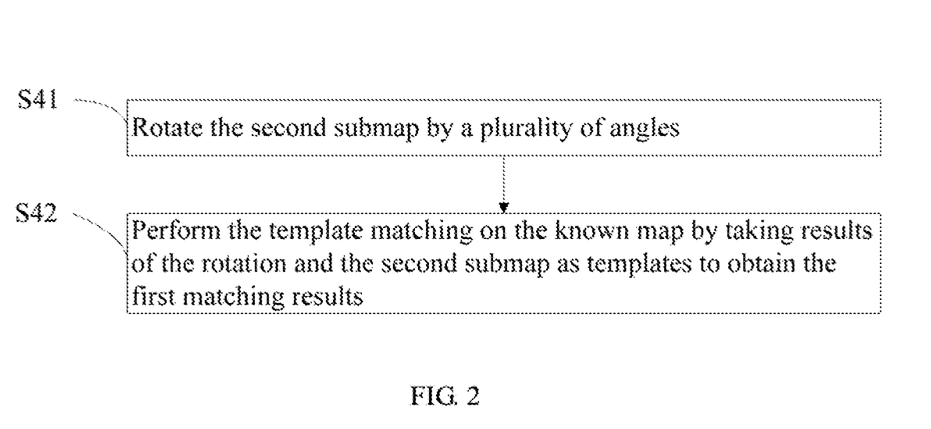
FIG. 2 is a flow chart of an example of step S4 of the relocalization method of FIG. 1.

FIG. 2 is a flow chart of an example of step S4 of the relocalization method of FIG. 1. As shown in FIG. 2, step S4 of the method of FIG. 1 may include the following steps.

S41: rotating the second submap by a plurality of angles.

S42: performing the template matching on the known map by taking a plurality of results of the rotation and the second submap as templates to obtain the first matching results.

In other embodiments, the known map can be rotated by a plurality of angles, and the second submap can be used as the template to perform the template matching on the known map itself and the rotation results of the known map to obtain the plurality of first matching results.

Since the calculation amount of the template matching is large, the problem of the calculation amount will be particularly prominent when the size of the searched image is large. To reduce the time consumption of relocalization, an image pyramid can be adopted to accelerate the template matching.

The amount of the results of the template matching may be more than one, and there may be redundancy. To simplify the results and reduce the amount of subsequent calculations, the plurality of first matching results can be obtained by selecting the results of the template matching through non-maximum suppression. In other embodiments, the results of the template matching can be directly used as the plurality of first matching results.

S5: obtaining a plurality of second matching results each corresponding to each of the first matching results based on a positional relationship of the second submap in the first submap.

The size and the shape of the first matching result are consistent with that of the second submap, where the second submap is a part of the first submap while does not include complete information of the submap boundary points. To facilitate the subsequent point cloud registration, an inversed operation of the extracting in step S3 can be performed on each first matching result to obtain the corresponding second matching result. For example, the first submap is superimposed on the known map based on the position of each first matching result in the known map, such that the second submap and the first matching result are completely coincidence. At this time, the portion of the known map that is covered by or coincides with the first submap is the second matching result corresponding to the first matching result. In which, a positional relationship of the first matching result in the corresponding second matching result is the same as the positional relationship of the second submap in the first submap.

S6: matching boundary points in each of the second matching results with the submap boundary points to filter out a plurality of third matching results from the second matching results.

The registration can refer to finding transformation (e.g., rotation, shifting, and scaling) parameters such that one of two sets of points (which can be referred to as a source point set) can coincide with another of the two sets of points (which can be referred to as a destination point set) as much as possible. If the transformation parameters are successfully found and the coincidence between the source point set and the destination point set after the transformation meets the requirement, the registration can be considered as successful. The boundary points in the second matching results may be used as the source point set, and the submap boundary points may be used as the destination point set; or the submap boundary points may be used as the source point set, and the boundary points in the second matching results may be used as the destination point set.

The third matching results may be the second matching results which have successfully registered. The registration can calculate the transformation parameters, and the rotation angle in the transformation parameters is not necessarily the same as the angle used by the corresponding first matching results in the template matching.

Figure 3:
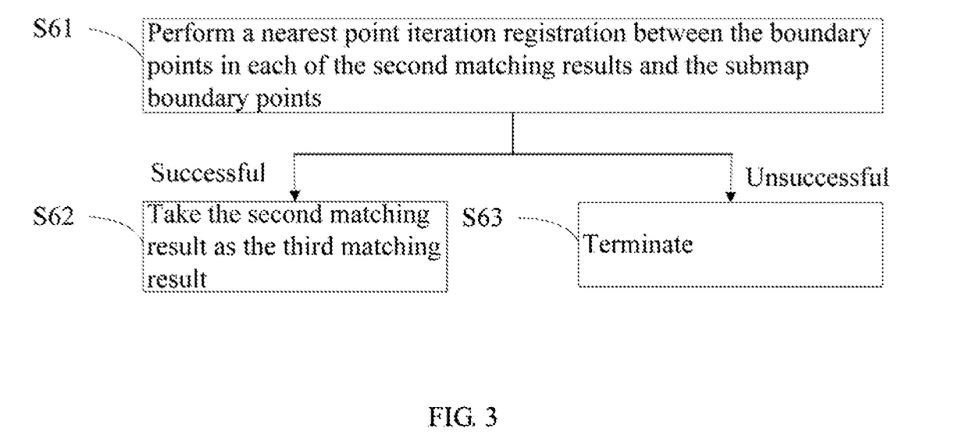
FIG. 3 is a flow chart of an example of step S6 of the relocalization method of FIG. 1.

FIG. 3 is a flow chart of an example of step S6 of the relocalization method of FIG. 1. As shown in FIG. 3, step S6 of the method of FIG. 1 may include the following steps.

S61: performing a nearest point iteration registration between the boundary points in each of the second matching results and the submap boundary points.

Iterative closest point (ICP) registration is a commonly used registration method, which mainly includes the steps of: (1) calculating a nearest point set: (2) calculating a transformation matrix; (3) applying the transformation matrix; and (4) calculating objective function and performing convergence determination. If the convergence condition determined to be met, the iteration ends, otherwise, it returns to step (1).

The unsuccessful ICP registration may include that the convergence condition is not met when the amount of iterations reaches a preset maximum value, or the coincidence between the transformation result obtained by applying the transformation matrix to the source point set and the destination point set does not meet the requirement.

If the ICP registration is successful, step S62 is executed; otherwise, step S63 is executed.

S62: taking the second matching result as the third matching result.

S63: terminating.

S7: selecting the most optimal one among the third matching results as a relocalization result.

If the amount of the third matching result is 1, the third matching result can be directly taken as the relocalization result. If the amount of the third matching results is larger than 1, the most optimal one among the plurality of third matching results is selected from the plurality of third matching results to take as the relocalization result based on a localization condition. For example, each third matching result may be evaluated by using a localization condition to obtain a localization evaluation value, and the most optimal third matching result is selected from the plurality of third matching results to take as the relocalization result based on the localization evaluation value. In one embodiment, the higher the localization evaluation value is, the more the localization condition is met, and the corresponding third matching result is more suitable as the relocalization result, where the most optimal third matching result has the highest localization evaluation value.

The localization condition includes at least one of that a coordinate of a relocalization position on the known map is within the free space, a scene change rate is within a preset range, and a ranging tool cannot pass through obstacles on the known map. In this embodiment, the relocalization position refers to the position of the robot which is determined based on the third matching results. In the normal case, the position of the robot on the known map should be in the free space. The scene change rate refers to an error rate between the source point set and the destination point set after transforming by using the transformation parameters obtained by the registration. Even if a scene change (e.g., an obstacle appears unexpectedly) is considered, the error rate should be within a preset range and not too large. The ranging tool refers to a tool used by the distance sensor to range. For example, the ranging tool of the lidar is laser, the ranging tool of an ultrasonic ranging sensor is ultrasonic, and the ranging tool of an infrared ranging sensor is infrared.

In this embodiment, in the relocalization process, the first submap is extracted to obtain the second submap, and the second submap is used to perform the template matching on the known map to obtain the first matching results. The second submap is obtained by using information of the free space of the first submap which can represent the main feature of the free space in the first submap. The relocalization by using the second submap can be more adaptive to the change of the environment, and with the help of the subsequent boundary point registration performed on the second matching result corresponding to the first matching result and the filtering based on the localization condition, the relocalization with high accuracy, high preciseness, and low error rate while there are environmental changes can be realized.

The specific process of the re localization is described below with reference to the accompanying drawings.

Figure 4:
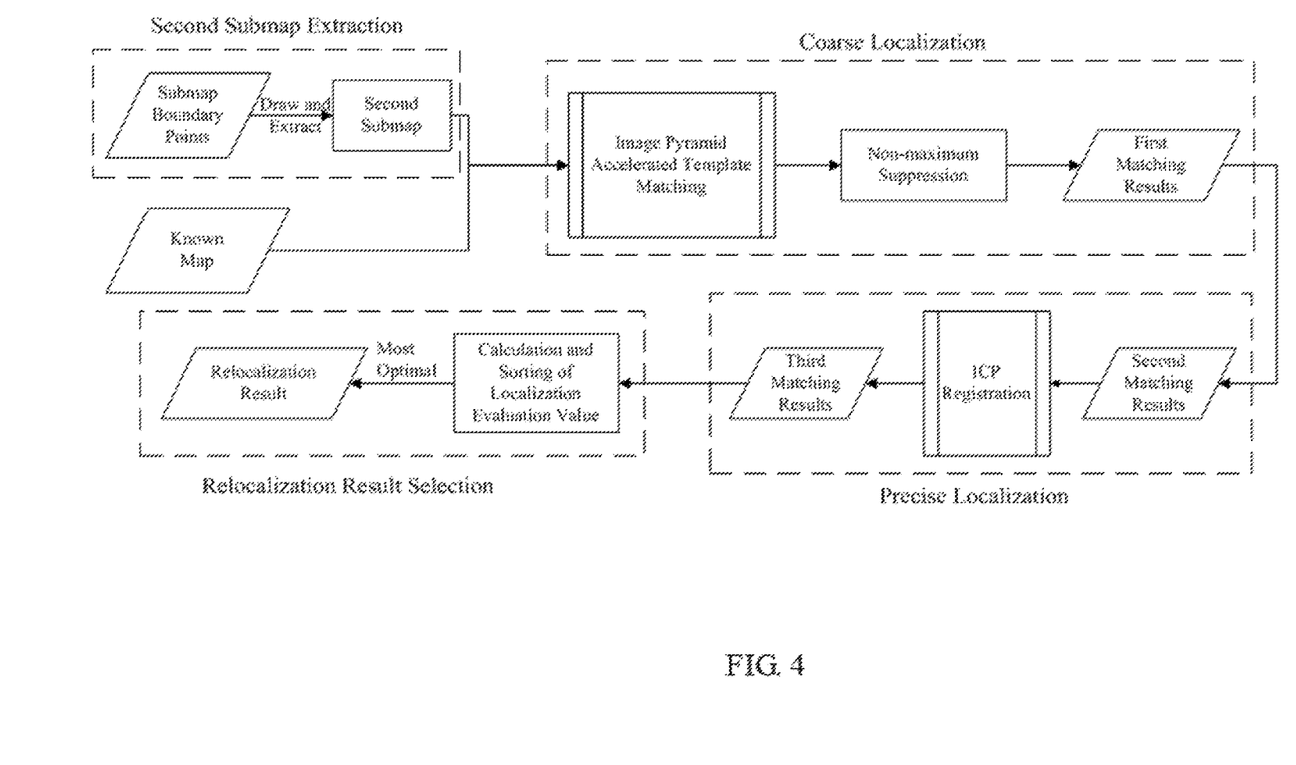
FIG. 4 is a schematic diagram of a relocalization process according to an embodiment of the present disclosure.

FIG. 4 is a schematic diagram of a relocalization process according to an embodiment of the present disclosure. As shown in FIG. 4, in this embodiment, the robot uses a lidar to perform localization.

First, the second submap is obtained. For example, the robot uses the lidar to scan the surrounding environment at the current position to obtain the plurality of submap boundary points which may also be referred to as a laser submap point cloud or a laser submap point set. The robot then draws the first submap based on the submap boundary points, and calculates the confidence weight of each pixel belonging to the free space on the first submap based on a laser data error model, and then calculates the sum TW of the confidence weights of all the pixels belonging to the free space in the first submap. Then, a smallest rectangle in the first submap which is centered on the current position and includes a*TW is extracted, where a is a preset threshold. The second submap can represent the main feature of the free space in the first submap.

Then, the second submap is used to perform the template matching on the known map to obtain the plurality of first matching results. This process may also be referred to as a coarse localization. For example, the second submap can be rotated by multiple angles to obtain a plurality of rotation results. These angles can be equally arranged within a range of 0 to 360 degrees. The more the amount of angles, the more the amount of calculations, while the less the possibility to miss the matching results. Then the rotation results and the second submap are used as the template respectively to perform the template matching on the known maps to obtain multiple template matching results, where the template matching is accelerated by using an image pyramid. And then a plurality of first matching results (also referred to as coarse localization results) can be obtained by selecting the template matching results through non-maximum suppression.

And then, the third matching results are obtained by using ICP registration. This process may also be referred to as a precise localization, which is a further filtering of the result of the coarse localization. For example, the robot may perform a reverse operation of the extracting on each first matching result based on the positional relationship of the second submap in the first submap to obtain the corresponding second matching results. The robot performs ICP registration on the boundary points in each second matching result and the submap boundary points. If successful, the second matching results are used as the third matching results; otherwise, the second matching results are not used as the third matchings. In such a manner, the third matching results (which may also be referred to as precise positioning results) is thus filtered out.

Finally, the most optimal third matching result is taken as the relocalization result. For example, if there is only one third matching result, the third matching result can be directly taken as the relocalization result; if the amount of the third matching results is larger than 1, each third matching result may be evaluated by using the localization condition to obtain the localization evaluation value, and the third matching result that has the highest localization evaluation value is taken as the relocalization result.

FIG. 5 is a schematic block diagram of an embodiment of a robot according to the present disclosure. In this embodiment, a robot 200 is provided. As shown in FIG. 5, the robot 200 includes a processor 210, a distance sensor 220, a storage 230, and a computer program 240.

The processor 210 controls the operation of the robot 200, which may also be referred to as a CPU (central processing unit). The processor 210 may be an integrated circuit chip with the capability to process signal sequences. The processor 210 may also be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The distance sensor 220 is capable of obtaining distance information between an obstacle within a ranging range and the distance sensor 220. The distance sensor can be a lidar, an ultrasonic ranging sensor, an infrared ranging sensor, or the like.

The computer program 240 is stored in the storage 230 and executable on the processor 210. When executing (instructions in) the computer program 240, the processor 210 implements the steps in the above-mentioned embodiments of the relocalization method (e.g., the relocalization method of FIG. 1). Alternatively, when the processor 210 executes the (instructions in) computer program 240, the functions of each module/unit in the above-mentioned device embodiments are implemented.

In the embodiments provided by the present disclosure, it should be understood that the disclosed method and apparatus may be implemented in other manners. For example, the above-mentioned apparatus embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

The integrated unit can be stored in a computer-readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium, which includes a number of instructions for enabling a computer device (which can be a personal computer, a server, a network device, etc.) or a processor to execute all or a part of the steps of the methods described in each of the embodiments of the present disclosure. The above-mentioned storage medium includes a variety of media such as a USB disk, a mobile hard disk, a read-only memory (ROM), a random access memory (RAM), a magnetic disk, and an optical disk which is capable of storing program codes.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented relocalization method, comprising executing on a processor the steps of:
   obtaining, through a distance sensor, a plurality of submap boundary points;
   drawing a first submap based on the plurality of submap boundary points;
   extracting a second submap from the first submap, wherein a ratio of a feature value of one or more free spaces of the second submap to a feature value of one or more free spaces of the first submap is larger than or equal to a preset threshold being larger than 0 and less than 1;
   performing a template matching on a known map based on the second submap to obtain a plurality of first matching results;
   obtaining a plurality of second matching results each corresponding to each of the plurality of first matching results based on a positional relationship of the second submap in the first submap, wherein a positional relationship of the first matching result in the corresponding second matching result is the same as the positional relationship of the second submap in the first submap;
   matching boundary points in each of the second matching results with the submap boundary points to filter out a plurality of third matching results from the plurality of second matching results; and
   selecting the most optimal one among the plurality of third matching results as a relocalization result.

2. The method of claim 1, wherein feature value of the one or more free spaces is one of a sum of the one or more free spaces and a weighted sum of the one or more free spaces, and the weight of the one or more free spaces is a confidence weight calculated based on a data error model.

3. The method of claim 2, wherein the second submap is centered on a carrier position in the first submap, and the free space feature value is equal to a minimum rectangle of a product of a free space feature value of the first submap and the preset threshold.

4. The method of claim 1, wherein the step of performing the template matching on the known map based on the second submap to obtain the plurality of first matching results comprises:
   rotating the second submap by a plurality of angles; and
   performing the template matching on the known map by taking a plurality of results of the rotation and the second submap as templates to obtain the plurality of first matching results.

5. The method of claim 1, wherein the template matching is accelerated by using an image pyramid.

6. The method of claim 1, wherein the plurality of first matching results are obtained by performing a non-maximum value suppression selection on a result of the template matching.

7. The method of claim 1, wherein the step of matching the boundary points in each of the second matching results with the submap boundary points to filter out the plurality of third matching results from the plurality of second matching results comprises:
   performing a nearest point iteration registration between the boundary points in each of the second matching results and die submap boundary points; and taking the second matching result as the third matching result, in response to the nearest point iteration registration being successful.

8. The method of claim 1, wherein the step of selecting one of the plurality of third matching results as the relocalization result comprises:
taking the third matching result as the relocalization result, in response to the amount of the third matching result being 1; and
selecting one of the plurality of third matching results being the most optimal from the plurality of third matching results to take as the relocalization result based on a localization condition, in response to the amount of the third matching result being larger than 1.

9. The method of claim 8, wherein the localization condition comprises at least one of a coordinate of a relocalization position on the known map being within the free space, a scene change rate being within a preset range, and a ranging tool cannot pass through obstacles on the known map.

10. A robot comprising:
a distance sensor;
a memory;
a processor; and
one or more computer programs stored in the memory and executable on the processor, wherein the one or more computer programs comprise:
instructions for obtaining, through a distance sensor, a plurality of submap boundary points;
instructions for drawing a first submap based on the plurality of submap boundary points;
instructions for extracting a second submap from the first submap, wherein a ratio of a feature value of one or more free spaces of the second submap to a feature value of one or more free spaces of the first submap is larger than or equal to a preset threshold being larger than 0 and less than 1;
instructions for performing a template matching on a known map based on the second submap to obtain a plurality of first matching results;
instructions for obtaining a plurality of second matching results each corresponding to each of the plurality of first matching results based on a positional relationship of the second submap in the first submap, wherein a positional relationship of the first matching result in the corresponding second matching result is the same as the positional relationship of the second submap in the first submap;
instructions for matching boundary points in each of the second matching results with the submap boundary points to filter out a plurality of third matching results from the plurality of second matching results; and
instructions for selecting the most optimal one among the plurality of third matching results as a relocalization result.

11. The robot of claim 10, wherein feature value of the one or more free spaces is one of a sum of the one or more free spaces and a weighted sum of the one or more free spaces, and the weight of the one or more free spaces is a confidence weight calculated based on a data error model.

12. The robot of claim 11, wherein the second submap is centered on a carrier position in the first submap, and the free space feature value is equal to a minimum rectangle of a product of a free space feature value of the first submap and the preset threshold.

13. The robot of claim 10, wherein the instructions for performing the template matching on the known map based on the second submap to obtain the plurality of first matching results comprise:
instructions for rotating the second submap by a plurality of angles; and
instructions for performing the template matching on the known map by taking a plurality of results of the rotation and the second submap as templates to obtain the plurality of first matching results.

14. The robot of claim 10, wherein the template matching is accelerated by using an image pyramid.

15. The robot of claim 10, wherein the plurality of first matching results are obtained by performing a non-maximum value suppression selection on a result of the template matching.

16. The robot of claim 10, wherein the instructions for matching the boundary points in each of the second matching results with the submap boundary points to filter out the plurality of third matching results from the plurality of second matching results comprise:
instructions for performing a nearest point iteration registration between the boundary points in each of the second matching results and the submap boundary points; and
instructions for taking the second matching result as the third matching result, in response to the nearest point iteration registration being successful.

17. The robot of claim 10, wherein the instructions for selecting one of the plurality of third matching results as the relocalization result comprise:
instructions for taking the third matching result as the relocalization result, in response to the amount of the third matching result being 1; and
instructions for selecting one of the plurality of third matching results being the most optimal from the plurality of third matching results to take as the relocalization result based on a localization condition, in response to the amount of the third matching result being larger than 1.

18. The robot of claim 17, wherein the localization condition comprises at least one of a coordinate of a relocalization position on the known map being within the free space, a scene change rate being within a preset range, and a ranging tool cannot pass through obstacles on the known map.

19. The robot of claim 10, wherein the distance sensor is a lidar.

* * * * *